(12) United States Patent  (10) Patent No.: US 7,775,337 B2
Moshenrose et al.  (45) Date of Patent: Aug. 17, 2010

(54) MAGNETIC CLUTCH

(75) Inventors: Paul Moshenrose, Ocean Springs, MS (US); Bruce Kiern, Gulfport, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 295 days.

(21) Appl. No.: 11/412,463

(22) Filed: Apr. 27, 2006

(65) Prior Publication Data

US 2007/0251796 A1 Nov. 1, 2007

(51) Int. Cl.
*F16D 27/01* (2006.01)
(52) U.S. Cl. ............... 192/84.31; 192/56.41; 192/84.3
(58) Field of Classification Search ............. 192/84.3, 192/56.41, 84.31, 84.91; 464/29; 15/390
See application file for complete search history.

(56) References Cited

U.S. PATENT DOCUMENTS

| | | | | |
|---|---|---|---|---|
| 1,826,929 A | * | 10/1931 | Furnas | ............ 192/84.91 |
| 2,962,143 A | | 11/1960 | Heinemann | |
| 2,962,144 A | * | 11/1960 | Zeh et al. | ............ 192/84.31 |
| 3,642,104 A | * | 2/1972 | Schafer | ............ 192/18 B |
| 4,079,820 A | | 3/1978 | Mattli | |
| 4,317,253 A | | 3/1982 | Gut et al. | |
| 4,446,595 A | | 5/1984 | Nakada et al. | |
| 4,610,047 A | | 9/1986 | Dick et al. | |
| 4,766,641 A | | 8/1988 | Daglow | |
| 4,938,327 A | * | 7/1990 | Tominaga | ............ 192/84.961 |
| 5,609,232 A | | 3/1997 | Brownfield | |
| 5,839,160 A | | 11/1998 | Wang et al. | |
| 6,067,689 A | | 5/2000 | Roney et al. | |
| 2004/0118653 A1 | * | 6/2004 | Ochiai et al. | ............ 192/84.91 |

FOREIGN PATENT DOCUMENTS

GB 751382 A 6/1956
GB 789938 A 1/1958

* cited by examiner

*Primary Examiner*—Rodney H Bonck
(74) *Attorney, Agent, or Firm*—Winston & Strawn LLP

(57) ABSTRACT

A magnetic clutch is provided according to an embodiment of the invention. The magnetic clutch includes a shaft including a flange, a magnetic clutch hub installed on the shaft, with the magnetic clutch hub being magnetically responsive, and an actuator member that magnetically operates on the magnetic clutch hub and causes the magnetic clutch hub to frictionally contact the flange of the shaft. The contact transfers rotational power between the magnetic clutch hub and the shaft.

9 Claims, 6 Drawing Sheets

SECTION AA

SECTION AA

SECTION BB

SECTION AA

MAGNETIC CLUTCH

TECHNICAL FIELD

The present invention relates to a clutch, and more particularly, to a magnetic clutch.

BACKGROUND OF THE INVENTION

Vacuum cleaners are available in a wide variety of designs and features. One common feature of a vacuum cleaner is a nozzle including a rotating brushroll. The brushroll is generally formed of a cylinder including bristles or tufts extending from the cylinder. When rotated, the bristles or tufts contact the underlying surface and operate to loosen and/or lift dirt and debris. Consequently, the dirt or debris is more readily pulled into a nozzle of the vacuum cleaner.

The brushroll is powered by a motor. In some vacuum cleaners, the motor is dedicated to powering the brushroll. Alternatively, the motor can also power other vacuum cleaner components, such as a blower motor, drive wheels, etc.

The brushroll is desirably rotated without any slippage. However, in some situations it is desirable that slippage occurs, such as when the brushroll encounters an obstacle. In addition, it is desirable that the rotation of the brushroll can be activated and deactivated, at the election of the user. As a result, some prior art vacuum cleaners have included a mechanical clutch or other power transmission device that allows some slippage when the brushroll is prevented from turning. However, the prior art mechanical clutch devices are complex, heavy, and expensive. Alternatively, some prior art vacuum cleaners provide the ability to disengage or otherwise stop the agitator brush by providing a dedicated electric motor and control switch. This prior art approach also adds increased design complexity, weight, and cost.

SUMMARY OF THE INVENTION

A magnetic clutch is provided according to an embodiment of the invention. The magnetic clutch comprises a shaft including a flange, a magnetic clutch hub installed on the shaft, with the magnetic clutch hub being magnetically responsive, and an actuator member that magnetically operates on the magnetic clutch hub and causes the magnetic clutch hub to frictionally contact the flange of the shaft. The contact transfers rotational power between the magnetic clutch hub and the shaft.

A magnetic clutch is provided according to an embodiment of the invention. The magnetic clutch comprises a shaft including a flange and a magnetic clutch hub installed on the shaft. The magnetic clutch hub is magnetically responsive. The magnetic clutch further comprises one or more drag washers in the magnetic clutch hub. The one or more drag washers are configured to rotatably fit onto the shaft and are configured to generate a high level of friction. The magnetic clutch further comprises an actuator member that magnetically compresses the one or more drag washers between the magnetic clutch hub and the flange of the shaft in order to transfer rotational power between the magnetic clutch hub and the shaft.

A magnetic clutch is provided according to an embodiment of the invention. The magnetic clutch comprises a shaft including a clutch region and a flange. The clutch region includes a predetermined cross-sectional geometry. The magnetic clutch further comprises one or more shaft washers configured to fit onto the clutch region of the shaft. A shaft washer of the one or more shaft washers includes an aperture that substantially conforms to the predetermined cross-sectional geometry of the clutch region. The magnetic clutch further comprises a hub housing installed on the clutch region of the shaft. The hub housing includes a working region on an exterior of the hub housing, a chamber in an interior of the hub housing, and one or more hub washers in the chamber. The one or more hub washers are configured to rotate with the hub housing. The hub housing is configured to slide axially on the clutch region by a predetermined amount. The magnetic clutch further comprises a cap installed to the hub housing, wherein the cap and the hub housing form a magnetic clutch hub when assembled and wherein the cap traps the flange in the chamber. The magnetic clutch further comprises one or more drag washers configured to rotatably fit within the chamber of the magnetic clutch hub and configured to rotatably fit onto the clutch region of the shaft. A drag washer of the one or more drag washers is interposed between a corresponding shaft washer and a corresponding hub washer. The magnetic clutch further comprises an actuator member that magnetically compresses the one or more hub washers, the one or more drag washers, and the one or more shaft washers between the magnetic clutch hub and the flange of the shaft in order to transfer rotational power between the magnetic clutch hub and the shaft.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-6 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
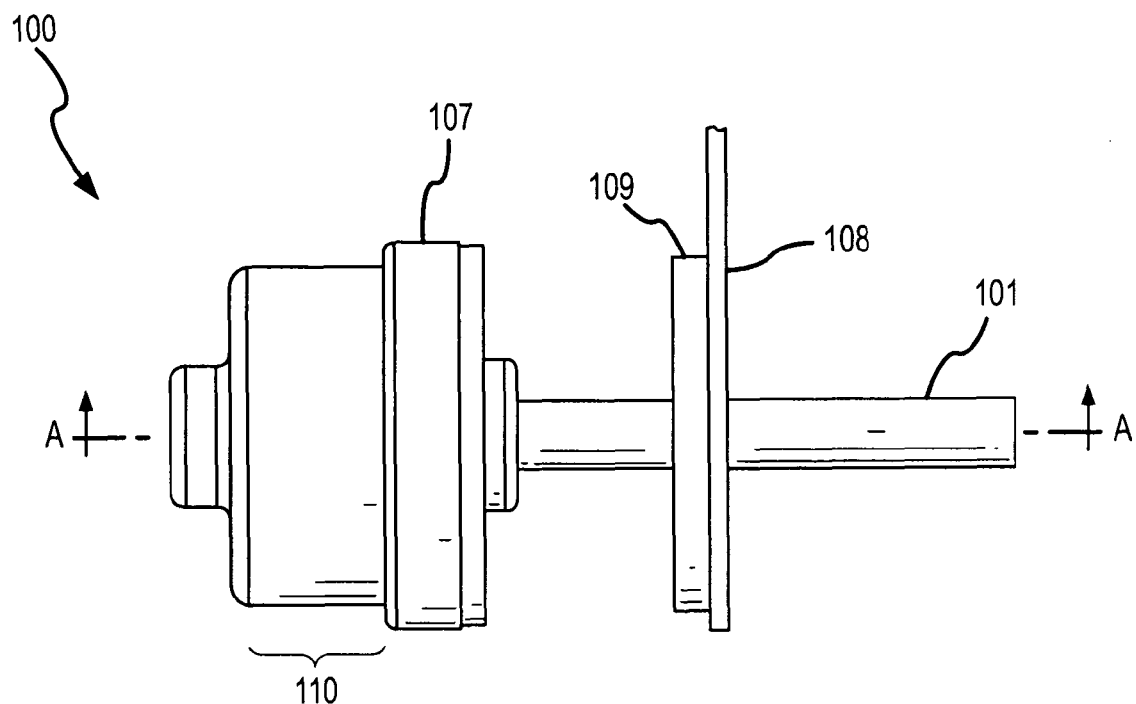
FIG. 1 shows a magnetic clutch according to an embodiment of the invention.

FIG. 1 shows a magnetic clutch 100 according to an embodiment of the invention. The magnetic clutch 100 can include a magnetic clutch hub 107 and an actuator member 108. The magnetic clutch hub 107 can be installed on a shaft 101 and can transmit rotational power. As is described in more detail below, the magnetic clutch 100 can transfer rotational power from an external source to the shaft 101 through the magnetic clutch hub 107. In addition, it should be understood that the magnetic clutch 100 can transfer rotational power from the shaft 101 to an external component. Consequently, the magnetic clutch hub 107 can include a working region 110 for receiving some manner of belt (not shown). Alternatively, the working region 110 can comprise teeth (or other power transfer features, not shown) that transfers rotational power.

The magnetic clutch 100 can be activated or deactivated in order to selectively transmit power to or from the shaft 101. The magnetic clutch hub 107 can interact with the actuator member 108 in one embodiment in order to be activated. The actuator member 108 can include one or more magnets 109 that interact with and activate internal components of the magnetic clutch hub 107 (see FIGS. 2 and 6). In one embodiment, the actuator member 108 is axially movable with respect to the shaft 101. As a result, the one or more magnets 109 can be brought into the vicinity of or away from the magnetic clutch hub 107. Alternatively, the actuator member 108 can be movable or stationary and the one or more magnets 109 can comprise one or more electromagnets that can be electrically energized in order to activate the magnetic clutch hub 107.

The shaft 101 can be connected to a brushroll or other part of a vacuum cleaner (not shown). The shaft 101 in one embodiment is embedded in (or otherwise affixed to) a rotating vacuum cleaner component. Consequently, the shaft 101 can further transmit power to one or more rotating components of the vacuum cleaner.

Figure 2:
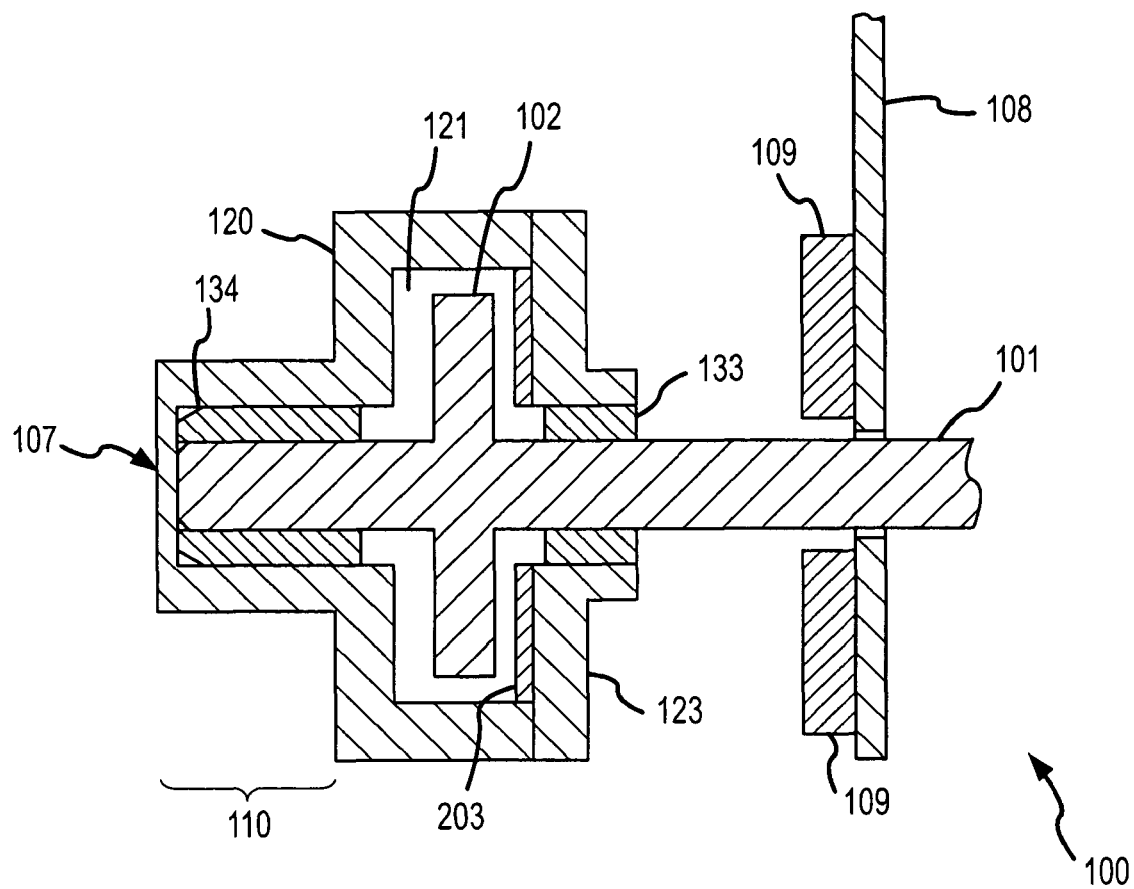
FIG. 2 is a first section view AA that shows detail of the magnetic clutch of FIG. 1 according to an embodiment of the invention.

FIG. 2 is a first section view AA that shows detail of the magnetic clutch 100 of FIG. 1 according to an embodiment of the invention. The magnetic clutch hub 107 in this embodiment includes a hub housing 120 and a cap 123 that is assembled to the hub housing 120 in order to form the magnetic clutch hub 107. The cap 123 can comprise a magnetically responsive material. For example, the cap 123 can comprise iron or an iron alloy. Alternatively, the cap 123 can include an attached iron plate or portion (see FIG. 4 and the accompanying discussion). The magnetic clutch hub 107 further includes the working region 110, a chamber 121, bearing devices 133 and 134, and the actuator member 108 and the one or more magnets 109. The bearing devices 133 and 134 can comprise bushings or other low friction rotational support devices. The chamber 121 receives a flange 102 formed on the shaft 101 (see also FIG. 3).

In operation, the one or more magnets 109 are used to attract or repel the magnetic clutch hub 107 and cause the magnetic clutch hub 107 to slide axially on the shaft 101. The movement of the magnetic clutch hub 107 in one embodiment causes the magnetic clutch hub 107 to contact the flange 102 and therefore to impart rotational power to the shaft 101. The transfer of rotational power, and the amount of slippage, can be controlled by the distance between the actuator member 108 and the magnetic clutch hub 107 and by the friction between the magnetic clutch hub 107 and the flange 102. To that end, the chamber 121 can include a friction surface 203 that contacts the flange 102. The friction surface 203 can comprise a high friction material. The friction surface 203 can comprise any manner of texturing, ridging, roughening, etc. Alternatively, the friction surface 203 can comprise one or more drag washers that rotate freely in the chamber 121 and rotate freely on the shaft 101 (also see FIG. 6 and the discussion below).

In another embodiment, the one or more magnets 109 can repel the hub housing 120, wherein the hub housing 120 contacts the opposite side of the flange 102 (i.e., the left side in the figure). In addition, the hub housing 120 can include a friction surface 203 on the other side of the chamber 121, or both sides.

The one or more magnets 109 can comprise permanent magnets and the actuator member 108 can be axially movable with respect to the shaft 101 and the magnetic clutch hub 107, as previously discussed. As a result, the actuator member 108 can move the one or more magnets 109 into close proximity with the magnetic clutch hub 107 in order to activate the magnetic clutch 100. Alternatively, the one or more magnets 109 can comprise electromagnets that can be electrically energized in order to activate the magnetic clutch 100.

Figure 3:
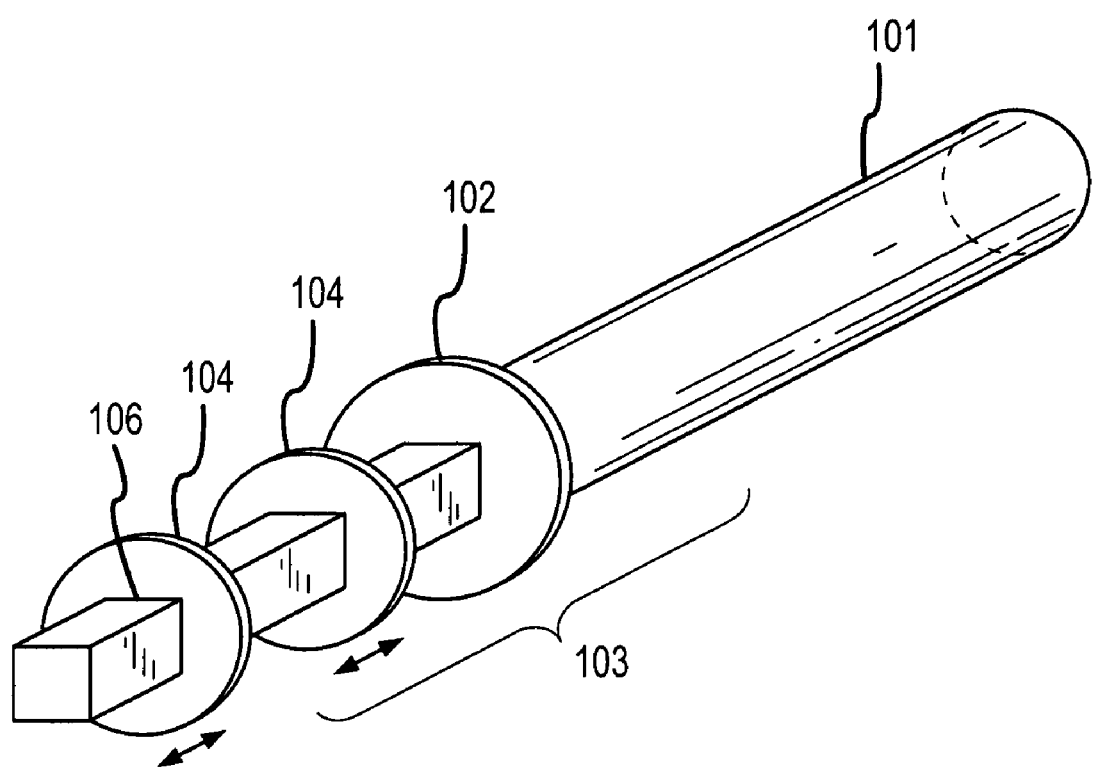
FIG. 3 shows detail of a shaft according to an embodiment of the invention.

FIG. 3 shows detail of the shaft 101 according to an embodiment of the invention. The shaft 101 can include a clutch region 103 for accepting the magnetic clutch hub 107. the shaft 101 can further include the flange 102, wherein the flange 102 is located between the clutch region 103 and the rest of the shaft 101.

The shaft 101 in one embodiment further includes one or more shaft washers 104. The shaft washers 104 are configured to fit onto the clutch region 103 in a slidable manner, but are constrained by the cross-sectional geometry of the clutch region 103 from rotating independently of the shaft 101. Therefore, the one or more shaft washers 104 are constrained to rotate with the shaft 101.

The shaft washer 104 includes an aperture 106. The aperture 106 in one embodiment substantially conforms to the cross-sectional geometry of the clutch region 103. In the embodiment shown, the cross-sectional geometry is substantially rectangular. However, it should be understood that the cross-sectional geometry can be of any desired configuration, including splined, keyed, toothed, star-shaped, etc.

Figure 4:
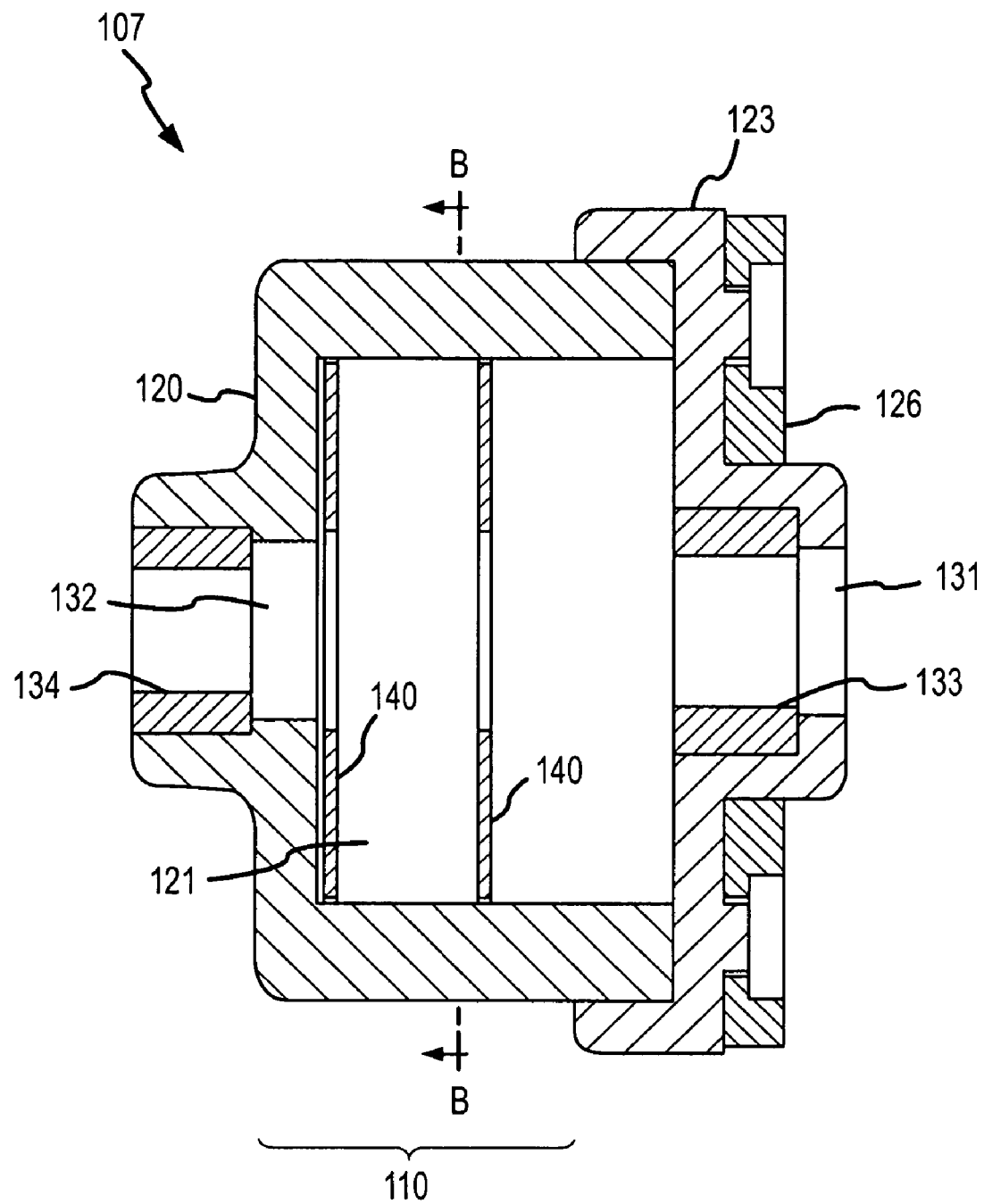
FIG. 4 shows detail of a magnetic clutch hub according to an embodiment of the invention.

FIG. 4 shows detail of the magnetic clutch hub 107 according to an embodiment of the invention. The magnetic clutch hub 107 in this embodiment includes the hub housing 120 and the cap 123 that fits to the hub housing 120. The cap 123 in one embodiment comprises a magnetically non-responsive material, such as a plastic, for example. A backing plate 126 can be affixed to the cap 123. The backing plate 126 comprises a magnetically responsive material, such as iron and materials including iron. The cap 123 includes a shaft aperture 131 and a bearing device 133. The hub housing 120 likewise includes a blind shaft aperture 132 and a bearing device 134. As before, a bearing device can comprise a bushing or other low friction rotational support device. The magnetic clutch hub 107 further includes one or more hub washers 140. The hub washers 140 are constrained to rotate with the hub housing 120 (see FIGS. 5 and 6).

Figure 5:
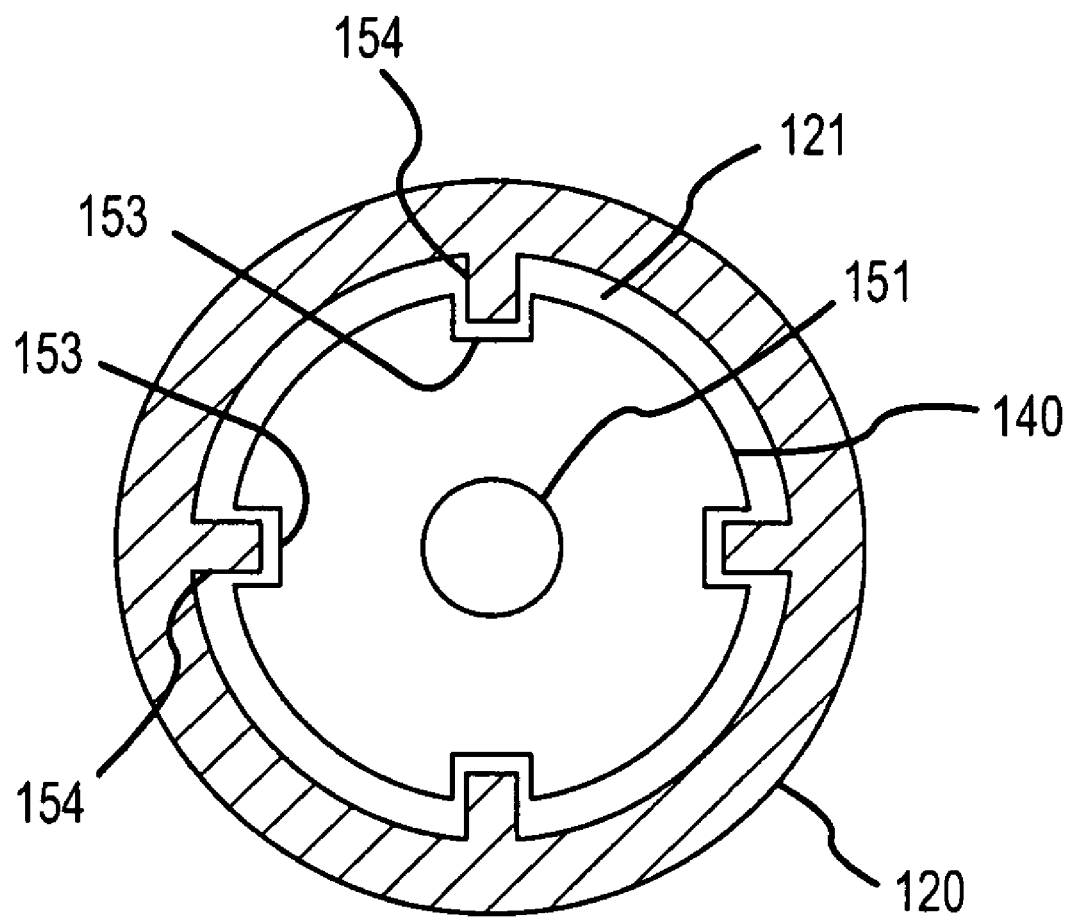
FIG. 5 is a section view BB of a hub housing of FIG. 4 according to an embodiment of the invention.

FIG. 5 is a section view BB of the hub housing 120 of FIG. 4 according to an embodiment of the invention. The chamber 121 of the hub housing 120 is configured to receive, among other things, the one or more hub washers 140 that are configured to rotatably fit onto the clutch region 103 of the shaft 101. The hub housing 120 in this view shows one such hub washer 140. The one or more hub washers 140 are configured to rotate on the clutch region 103 and can move axially on the clutch region 103. The hub housing 120 (and the one or more hub washers 104) can include some manner of ribs, splines, teeth, or other features that force the one or more hub washers 140 to rotate with the hub housing 120. As a result, the one or more hub washers 104 are constrained to rotate with the hub housing 120.

The hub washer 140 in the embodiment shown includes an aperture 151 and one or more depressions 153. The one or more depressions 153 correspond to projections 154 in the chamber 121 of the hub housing 120. It should be understood that alternatively the one or more depressions 153 can be formed in the hub housing 120 and the projections 154 can be formed on the hub washer 140. It should be further understood that the shape and number of projections and depressions can be varied as needed and still remain within the scope of the description and claims.

Figure 6:
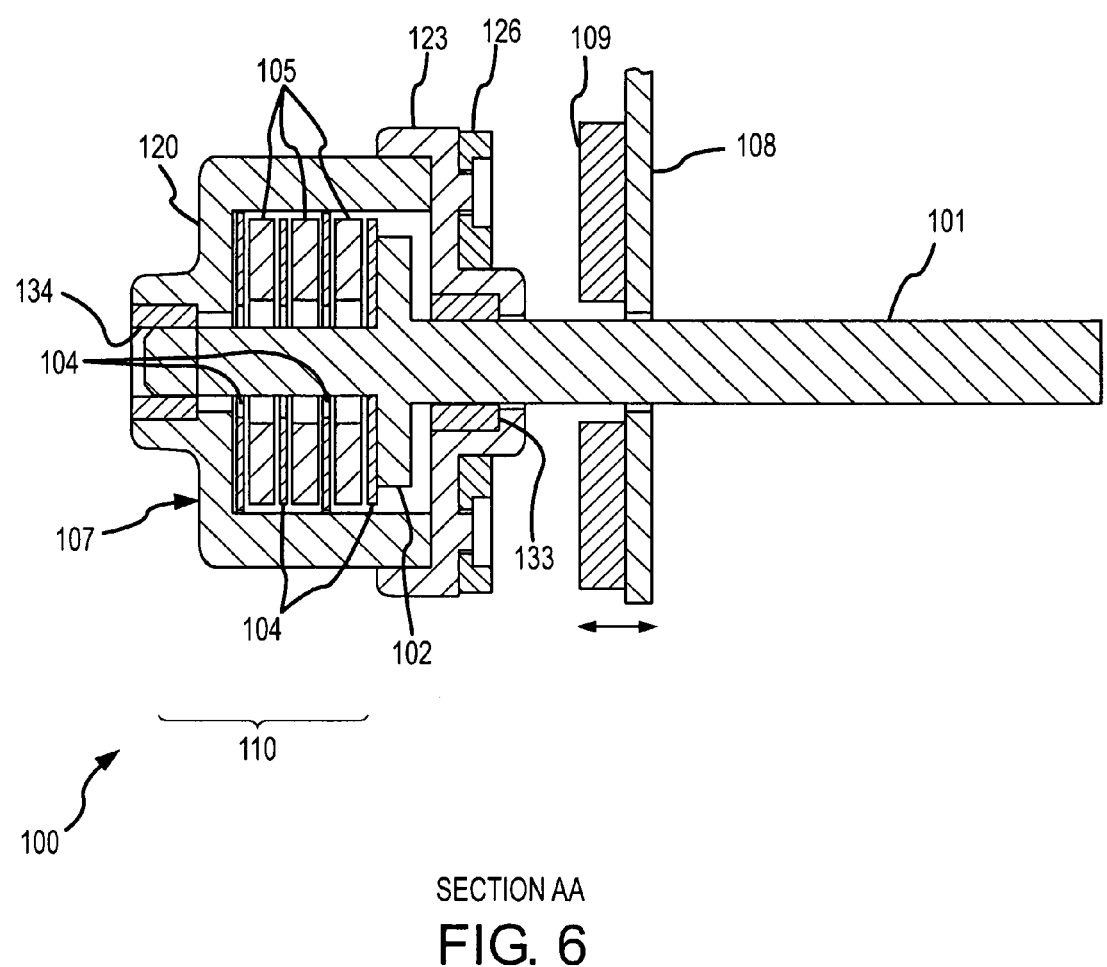
FIG. 6 is a second section view AA that shows detail of the magnetic clutch of FIG. 1 according to an embodiment of the invention.

FIG. 6 is a second section view AA that shows detail of the magnetic clutch 100 of FIG. 1 according to an embodiment of the invention. The magnetic clutch hub 107 is assembled to the shaft 101, wherein the clutch region 103 and the flange 102 of the shaft 101 reside within the chamber 121 of the magnetic clutch hub 107. The shaft 101 extends at least partially through the bearing devices 133 and 134 and can rotate within the bearing devices 133 and 134. The cap 123 is assembled to the hub housing 120 and the backing plate 126 is assembled to the cap 123. These components can be permanently or removably affixed to each other in any manner.

The assembled magnetic clutch 100 in this embodiment further includes one or more shaft washers 104. The one or more shaft washers 104 are received on the clutch region 103 of the shaft 101. The one or more shaft washers 104 are spaced apart from the one or more hub washers 140 by an appropriate number of drag washers 105. The drag washers 105 are sandwiched between and compressed by the hub washers 140 and the shaft washers 104. The drag washers 105 can comprise a high friction material. The drag washers 105 can include any manner of texturing, ridging, roughening, etc. As previously discussed, the one or more hub washers 140 are constrained to rotate with the hub housing 120 and the one or more shaft washers 104 are constrained to rotate with the shaft 101. As a result, the one or more drag washers 105 transmit the rotation of the one or more hub washers 140 to the one or more shaft washers 104 when the magnetic clutch hub 107 is activated by the actuator member 108. In turn, the shaft washers 104 transmit the rotation to the shaft 101.

It should be understood that the effectiveness (and ability to transfer rotational force or prevent slippage) can be determined by the number of hub, shaft, and drag washers used in this embodiment, along with the effectiveness of the one or more magnets 109. If only one drag washer 105 is used, the magnetic clutch 100 will have a relatively low slipping point. By adding more drag washers (and corresponding hub and shaft washers), the frictional force is increased and therefore the slipping point can be raised. Consequently, a greater rotational force can be transmitted by the magnetic clutch 100 before it reaches a point of slipping. As a result, the magnetic clutch 100 can be configured in various ways for various applications, various brushroll sizes/types, motor torques, etc.

It should be understood that the magnetic clutch according to the invention can be employed in many power transmission applications in a vacuum cleaner. In addition, the magnetic clutch can be used in other appliances and in other applications.

The magnetic clutch according the invention can be implemented according to any of the embodiments in order to obtain several advantages, if desired. The invention provides a power transmission clutch. The invention provides a mechanically simple and low cost power transmission clutch. The invention provides a magnetically activated power transmission clutch. The invention provides a power transmission clutch that offers a lower weight and cost. The invention provides a power transmission clutch that enables a user to control the engagement of a brushroll.

What is claimed is:

1. A rotatable magnetic clutch, comprising:
    a shaft including a clutch region and a flange, with the clutch region including a predetermined cross-sectional geometry;
    one or more shaft washers configured to fit onto the clutch region of the shaft, with a shaft washer of the one or more shaft washers including an aperture that substantially conforms to the predetermined cross-sectional geometry of the clutch region;
    a hub housing installed on the clutch region of the shaft, with the hub housing including a working region on an exterior of the hub housing, the working region adapted to transfer power to or from the hub housing, a chamber in an interior of the hub housing, and one or more hub washers in the chamber, with the one or more hub washers being configured to rotate with the hub housing and with the hub housing being configured to slide axially on the clutch region by a predetermined amount;
    a cap including a bearing device rotatably engaging the shaft, the cap installed to the hub housing, wherein the cap and the hub housing form a magnetic clutch hub when assembled and wherein the cap traps the flange in the chamber;
    one or more drag washers configured to rotatably fit within the chamber of the magnetic clutch hub and configured to rotatably fit onto the clutch region of the shaft, with a drag washer of the one or more drag washers being interposed between a corresponding shaft washer and a corresponding hub washer; and
    an actuator member axially movable on the shaft to magnetically compress the one or more hub washers, the one or more drag washers, and the one or more shaft washers between the magnetic clutch hub and the flange of the shaft in order to transfer rotational power between the magnetic clutch hub and the shaft, thereby rotating the hub housing and the shaft.

2. The magnetic clutch of claim 1, with the actuator member magnetically attracting the magnetic clutch hub.

3. The magnetic clutch of claim 1, with the actuator member magnetically repelling the magnetic clutch hub.

4. The magnetic clutch of claim 1, with the shaft being formed of a magnetically non-responsive material.

5. The magnetic clutch of claim 1, further comprising a magnetically responsive backing plate affixed to the cap of the magnetic clutch hub.

6. The magnetic clutch of claim 1, with the actuator member including one or more magnets that operably slide the magnetic clutch hub axially on the shaft.

7. The magnetic clutch of claim 1, with the actuator member including one or more permanent magnets that operably slide the magnetic clutch hub axially on the shaft.

8. The magnetic clutch of claim 1, with the actuator member including one or more electromagnets that operably slide the magnetic clutch hub axially on the shaft.

9. The magnetic clutch of claim 1, wherein a hub washer of the one or more hub washers is configured to rotate with the hub housing and configured to rotate on the shaft.

* * * * *